(12) United States Patent
Tamura et al.

(10) Patent No.: US 12,504,447 B2
(45) Date of Patent: Dec. 23, 2025

(54) CURRENT SENSOR

(71) Applicant: Alps Alpine Co., Ltd., Tokyo (JP)

(72) Inventors: Manabu Tamura, Miyagi-ken (JP);
Keisuke Nakayama, Miyagi-ken (JP);
Takahiro Taoka, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 138 days.

(21) Appl. No.: 18/539,407

(22) Filed: Dec. 14, 2023

(65) Prior Publication Data
US 2024/0110952 A1    Apr. 4, 2024

Related U.S. Application Data

(63) Continuation of application No. PCT/JP2022/009898, filed on Mar. 8, 2022.

(30) Foreign Application Priority Data

Aug. 19, 2021    (JP) .................................. 2021-134306

(51) Int. Cl.
*G01R 15/20* (2006.01)
*G01R 19/00* (2006.01)
(52) U.S. Cl.
CPC ......... *G01R 15/205* (2013.01); *G01R 15/207* (2013.01); *G01R 19/0092* (2013.01)
(58) Field of Classification Search
None
See application file for complete search history.

(56) References Cited

U.S. PATENT DOCUMENTS

| | | | |
|---|---|---|---|
| 7,936,165 B2 | 5/2011 | Matsumura et al. | |
| 8,035,040 B2 | 10/2011 | Nishikawa | |
| 10,267,826 B2 | 4/2019 | Harada | |
| 10,306,798 B2 | 5/2019 | Daigo et al. | |
| 11,092,621 B2 | 8/2021 | Suzuki et al. | |
| 2011/0148407 A1* | 6/2011 | Kawaguchi | G01R 15/207 324/244 |
| 2013/0293226 A1 | 11/2013 | Onuma et al. | |
| 2020/0132728 A1 | 4/2020 | Boury et al. | |
| 2020/0191835 A1 | 6/2020 | Bilbao De Mendizabal et al. | |

FOREIGN PATENT DOCUMENTS

| | | | |
|---|---|---|---|
| CN | 205749638 U | * | 11/2016 |
| JP | 2000-174357 A | | 6/2000 |
| JP | 2010-41746 A | | 2/2010 |
| JP | 2010-71777 A | | 4/2010 |
| JP | 2013-250257 A | | 12/2013 |

(Continued)

*Primary Examiner* — Rodney E Fuller
(74) *Attorney, Agent, or Firm* — Harness, Dickey & Pierce, P.L.C.

(57) ABSTRACT

A current sensor capable of efficiently cooling a busbar by using a cooling device includes a busbar, a shield disposed to face the busbar, a magnetic sensor disposed between the shield and the busbar, and an enclosure that integrally encases part of the busbar, the shield, and the magnetic sensor. When a side on which the busbar is disposed in the X-axis direction in which the busbar, the magnetic sensor, and the shield are arranged is defined as an X1 side, the busbar is disposed on the X1 side from the center line of the enclosure, and at least the X1 side of the enclosure is disposed to face the cooling device.

16 Claims, 11 Drawing Sheets

(56) References Cited

FOREIGN PATENT DOCUMENTS

| | | | | |
|---|---|---|---|---|
| JP | 2016-1168 A | | 1/2016 | |
| JP | 2017153306 A | * | 8/2017 | ......... H05K 7/20518 |
| JP | 2020-106302 A | | 7/2020 | |
| WO | WO-2015178478 A1 | * | 11/2015 | ............. G01R 15/20 |
| WO | WO-2016190087 A1 | * | 12/2016 | ............. G01R 15/20 |
| WO | 2018-051575 A1 | | 3/2018 | |
| WO | WO-2021090603 A1 | * | 5/2021 | ............ H02M 7/003 |
| WO | WO-2021199805 A1 | * | 10/2021 | ................ H02P 5/74 |

\* cited by examiner

CURRENT SENSOR

CLAIM OF PRIORITY

This application is a Continuation of International Application No. PCT/JP2022/009898 filed on Mar. 8, 2022, which claims benefit of Japanese Patent Application No. 2021-134306 filed on Aug. 19, 2021. The entire contents of each application noted above are hereby incorporated by reference.

BACKGROUND OF THE INVENTION

1. Field of the Invention

The present invention relates to a current sensor that measures a current flowing through a busbar on the basis of a magnetic field.

2. Description of the Related Art

In recent years, with the increasing demand for decarbonization, the shift from combustion engines to electric motors, that is, the shift from gas-powered vehicles to EVs (EV shift) has accelerated to reduce $CO_2$ emissions during vehicle operation. As the EV shift spreads to large commercial vehicles, such as trucks and buses, the motor capacities of hybrid vehicles and electric vehicles are also increasing, and the currents measured by current sensors used for motor control are also increasing. A busbar, which is the current path of the measured current, emits the amount of heat proportional to the square of the magnitude of the current. For this reason, the amount of heat generated from the busbar increases with increasing continuous current caused by the increase in motor capacity. The increase in the amount of generated heat may cause problems, such as a decrease in the accuracy of a current sensor and a decrease in product life. However, increasing the cross section of a busbar to reduce heat generation is disadvantageous in terms of reducing the size and weight of the current sensor. Therefore, to deal with the heat generated by the busbar, a cooling device can be installed, and the current sensor can be disposed at a position facing the cooling device to enable cooling of the busbar.

Japanese Unexamined Patent Application Publication No. 2016-1168 describes a busbar module with a current sensor that can prevent the temperature rise of the current sensor and accurately measure the current value of the busbar. The busbar module with a current sensor described in Japanese Unexamined Patent Application Publication No. 2016-1168 is provided with at least a pair of shielding plates at positions so as to sandwich the busbar and the current sensor in the thickness direction to shield the magnetic field.

In the busbar module with a current sensor described in Japanese Unexamined Patent Application Publication No. 2016-1168, the busbar is located in the vicinity of the center in the height direction of an enclosure, and other components, such as the shielding plates, are placed between the busbar and the outer surface of the enclosure in the height direction. Consequently, it is difficult to efficiently cool the busbar by installing a cooling device facing the busbar. The present invention provides a current sensor capable of efficiently cool a busbar by using a cooling device.

SUMMARY OF THE INVENTION

A current sensor cooled by a cooling device includes a busbar, a shield disposed to face the busbar, a magnetic sensor disposed between the shield and the busbar, and an enclosure that integrally encases part of the busbar, the shield, and the magnetic sensor. When a side on which the busbar is disposed in a first direction in which the busbar, the magnetic sensor, and the shield are arranged is defined as one side, the busbar is disposed on the one side from the center of the enclosure. At least the one side of the enclosure is disposed to face the cooling device. Since no shield is provided between the busbar that generates heat and the cooling device and, thus, the busbar is disposed close to the cooling device, the busbar can be efficiently cooled by the cooling device.

The busbar may include a first current path extending in a direction having a component of a second direction that is perpendicular to the first direction and a second current path and a third current path extending from the one end and the other end in the second direction of the first current path, respectively, in a direction having a component of a third direction that is perpendicular to the first direction and the second direction. The magnetic sensor may be disposed to face the first current path, and a sensitivity direction of the magnetic sensor may be the third direction. By setting the sensitivity direction of the magnetic sensor to the third direction, the sensitivity of the current sensor is improved because the influence of a magnetic field from an adjacent phase can be reduced when current sensors in a plurality of phases are arranged in the second direction. Since the number of magnetic sensors included in a current sensor can be one or more, a set of a busbar, a shield, and a magnetic sensor corresponding to a single measured current is referred to as a "phase" as appropriate. The present invention can be applied to both a single-phase current sensor with a one-set phase and a multiphase current sensor with multiple-set phases.

A plurality of measurement units each including the busbar, the shield, and the magnetic sensor may be arranged in the second direction. The position of the second current path extending from the one end of the first current path differs from a position of the third current path extending from the other end in the first direction and, as viewed in the first direction, the second current path of one of two of the adjacent busbars and the third current path of the other busbar may be disposed so as to overlap at least partially. When a plurality of measurement units are arranged in the second direction, this configuration allows the second current path of one of two busbars of two adjacent measurement units and the third current path of the other busbar to be disposed so as to overlap as viewed in plan view from the first direction. As a result, when a plurality of measurement units are arranged in the second direction, the size of the current sensor in the second direction can be reduced.

The first current path may include a first flat portion having the one end, a second flat portion having the other end, and an intermediate portion that connects the first flat portion to the second flat portion and, as viewed in the third direction, the intermediate portion may extend diagonally to the first direction. This configuration allows the second current path of one of the two adjacent magnetic sensors to be disposed so as to overlap the intermediate portion of the other magnetic sensor as viewed in the first direction. As a result, the overlapping area between the busbar of one phase and the busbar of the other phase can be increased.

The magnetic sensor may be disposed to face a surface of the first flat portion of the first current path adjacent to the second flat portion. This configuration allows the magnetic sensor to be disposed at a position that overlaps the intermediate portion or the second flat portion as viewed in the second direction, thus reducing the size of the current sensor in the first direction.

In this case, when the first current path is viewed in plan view from the third direction, the length of the first flat portion may be greater than the sum of a length of the second flat portion and a length of the intermediate portion in the second direction. By increasing the length of the first flat portion, the region in the first flat portion where the current consisting of a component flowing almost in the second direction flows can be increased. As a result, by placing the magnetic sensor so that the magnetic sensor faces a surface of the first flat portion adjacent to the second flat portion, the current can be accurately measured.

The busbar may include an exposed portion that is in a surface on the one side in the first direction and that is not covered by the enclosure, and the exposed portion may face the cooling device. By providing the exposed portion in a region facing the cooling device, the cooling efficiency to cool the busbar is improved. The exposed portion may be covered by a sealing member having a higher heat transfer rate than the enclosure and having insulating properties. By covering the exposed portion with a material that has both sealing function and heat dissipation function, the cooling property can be ensured, and short-circuits and corrosion of the busbar can be reduced.

The busbar may include a heat dissipating section in a portion facing the magnetic sensor, and the heat dissipating section may face the cooling device. The heat dissipating section may include, on either side of a to-be-measured portion facing the magnetic sensor as viewed in the first direction, wide heat dissipation portions each wider than the to-be-measured portion. The wide heat dissipation portion may include a hollow portion having a tip side opening. By providing the heat dissipating section, the cooling efficiency of the cooling device to cool the busbar is improved. In addition, by providing the wide heat dissipation portion and the hollow portion, the surface area is increased, which improves the heat dissipation efficiency.

A heat sink may be disposed on the side of the enclosure facing the cooling device and between the busbar and the cooling device. A fastening member may be disposed on the side of the busbar facing the cooling device, and the fastening member may be in contact with the busbar. The busbar may be formed integrally with the enclosure. These configurations allow the busbar to dissipate heat through the heat sink, a nut, and the enclosure, which improves the cooling efficiency.

A substrate on which the magnetic sensor is provided may be connected to the enclosure via a boss section of the enclosure. By partially connecting the substrate and the enclosure via the boss section, rather than making extensive surface contact, heat transfer from the enclosure to the magnetic sensor provided on the substrate is reduced.

The cooling device may include a shield section that has a function of shielding magnetism on a portion of the cooling device facing the one side of the enclosure. When the current sensor is placed facing the cooling device, the influence of disturbance noise from one side of the current sensor on the current sensor can be reduced by the shield section of the cooling device that has the same function as the shield.

DESCRIPTION OF THE PREFERRED EMBODIMENTS

Figure 1A:
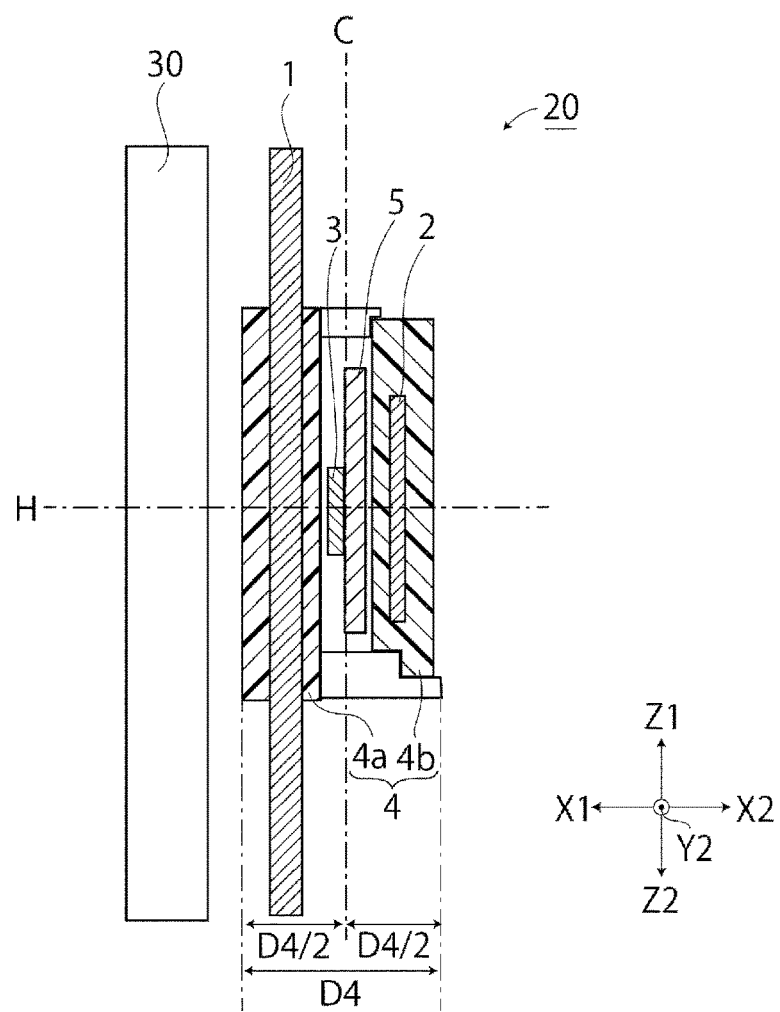
FIG. 1A is a cross-sectional view of a current sensor cut by the XZ plane along a straight line Lx illustrated in FIG. 1B.
Figure 1B:
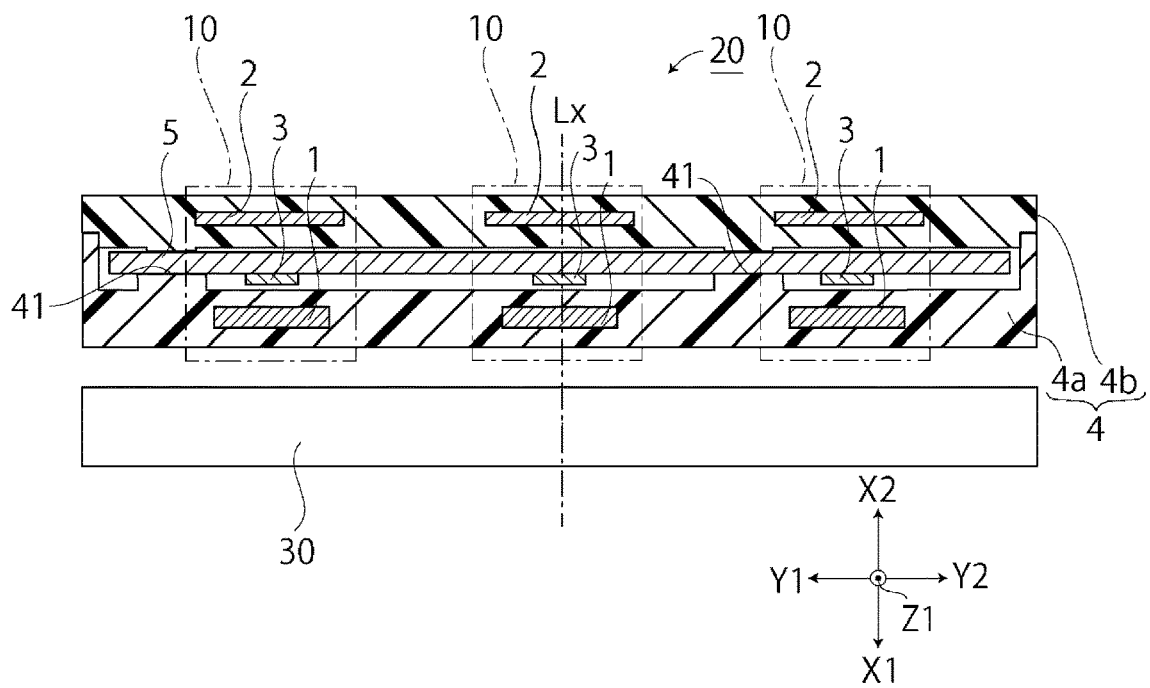
FIG. 1B is a cross-sectional view of the current sensor cut by the XY plane along a straight line H illustrated in FIG. 1A.

The embodiments of the present invention are described below with reference to the accompanying drawings. In the drawings, the same members are identified by the same reference numerals, and descriptions of the members are omitted as appropriate. In the drawings, X-Y-Z coordinates are illustrated as reference coordinates. FIG. 1A is a schematic cross-sectional view of a current sensor 20 cut by the XZ plane along a straight line Lx illustrated in FIG. 1B, and FIG. 1B is a schematic cross-sectional view of the current sensor 20 cut by the XY plane along a straight line H illustrated in FIG. 1A. The current sensor 20 includes a busbar 1, a shield 2, a magnetic sensor 3, and an enclosure 4 consisting of a case 4a and a cover 4b and is cooled by a cooling device 30 when in use. The current sensor 20 can be implemented as a busbar module with a current sensor.

The busbar 1 is a conductor through which a current to be measured, which is the detection target of the magnetic sensor 3, flows. The busbar 1 is made of copper, brass, or aluminum, for example. Part of the busbar 1 is encased in the case 4a of the enclosure 4 by insert molding and is formed integrally with the case 4a. The heat generated in the busbar 1 due to a current is dissipated via the case 4a that encases the busbar 1 or directly from the busbar 1 (heat dissipation). The number of measurement units 10 each consisting of the busbar 1, the shield 2, and the magnetic sensor 3 in current sensor 20 is not limited to three illustrated in FIG. 1B. The distances between the busbars 1 of adjacent measurement units 10 and the shapes of the plurality of busbars 1 may be the same or different.

The shield 2 is encased in the cover 4b of the enclosure 4 by insert molding. The shield 2 is disposed to face the busbar 1 to have a function of reducing electromagnetic interference caused by the busbar 1. For example, the shield 2 can be composed of a plurality of metal plates of the same shape.

The magnetic sensor 3 is mounted on a substrate 5. The magnetic sensor 3 is disposed between the shield 2 and the busbar 1 and detects a magnetic field produced by the current to be measured flowing in the busbar 1. For example, a magnetoresistive element, such as a GMR element or a TMR element, can be used as the magnetic sensor 3. The magnetoresistive element uses the magnetoresistive effect in which the electrical resistance changes with an external magnetic field.

The enclosure 4 integrally has part of the busbar 1, the shield 2, and the magnetic sensor 3 thereinside. The enclosure 4 consists of a case 4a that encases the part of the busbar 1 and a cover 4b that encases the shield 2. The case 4a is disposed on one side (the X1 side) and the cover 4b on the other side (the X2 side), and the X1 side of the enclosure 4 faces the cooling device 30. That is, since the case 4a, which encases the part of the busbar 1, is cooled by the cooling device 30, the busbar 1, which is heated by a large current flowing through the busbar 1, is also cooled. In addition, the case 4a and the cover 4b are fixed so as to be in tight contact. Therefore, the heat from the busbars 1 encased in the case 4a is also dissipated via the cover 4b and, thus, the busbars 1 are cooled. Furthermore, by fixing the case 4a to the cover 4b, the busbar 1, shield 2, and magnetic sensor 3 are fixed in place.

The busbar 1 is disposed at a position shifted from the center of a width D4 of the enclosure 4 toward the X1 side in a first direction (the X-axis direction) in which the busbar 1, the magnetic sensor 3, and the shield 2 are lined up. That is, the busbar 1 is disposed closer to the cooling device 30 than a center line C that passes through the center of the enclosure 4 in the X-axis direction. By placing the busbar 1, which generates heat, closer to the cooling device 30, the current sensor 20 can be efficiently cooled. Unlike the busbar module with a current sensor described in Japanese Unexamined Patent Application Publication No. 2016-1168, the shield 2 is not provided between the busbar 1 and the cooling device 30. Therefore, the cooling efficiency of the cooling device 30 to cool the busbar 1 is not reduced by the shield 2 and the resin integrally molded with the shield 2. For example, a device that uses natural convection of outside air or forced convection of air or water is employed as the cooling device 30.

As illustrated in FIG. 1B, the enclosure 4 includes a boss section 41. The substrate 5 having the magnetic sensor 3 mounted thereon is connected and fixed to the enclosure 4 via the boss section 41. By providing the boss section 41 as part of the enclosure 4 in this manner, a surface of the substrate 5 does not make extensive contact with the surface of the enclosure 4 and, thus, the heat generated in the busbar 1 is prevented from being transferred to the magnetic sensor 3.

Figure 2:
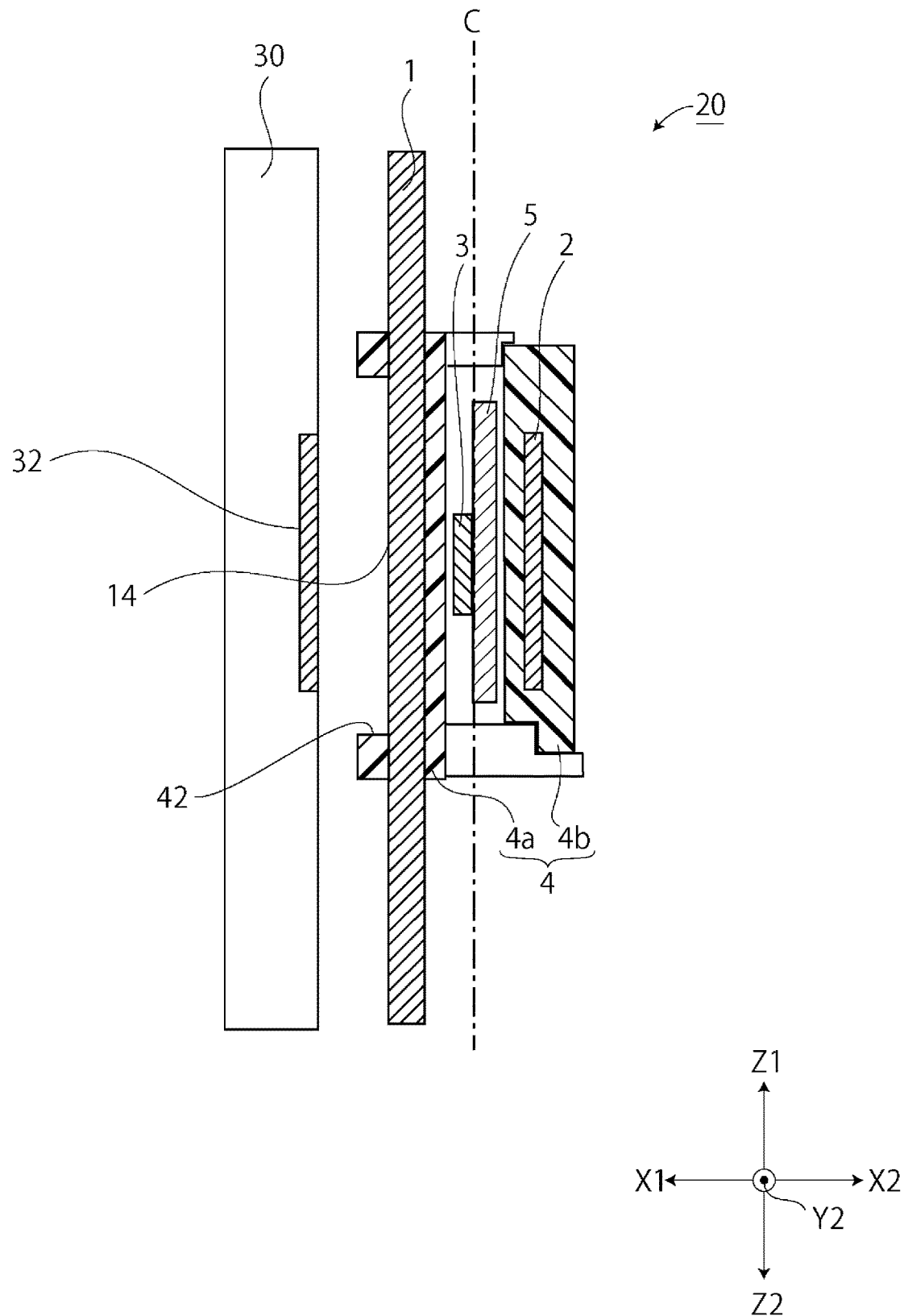
FIG. 2 is a cross-sectional view of a current sensor according to a modification.

FIG. 2 is a cross-sectional view of a current sensor 20 according to a modification and illustrates a part corresponding to FIG. 1A. The same applies to current sensors 20 according to the other modifications illustrated in FIGS. 3 to 5. As illustrated in FIG. 2, the busbar 1 may have an exposed portion 14 on the side opposite to the magnetic sensor 3 in the X-axis direction (on the X1 side), and the exposed portion 14 is not covered by the case 4a of the enclosure 4.

According to the present modification, a heat dissipation (cooling) recess 42 is provided in the X1-side outer surface of the case 4a of the enclosure 4, and the heat dissipation recess 42 is recessed to a position where the encased busbar 1 is visible, thus exposing a portion of the X1-side surface of the busbar 1. The surface of the busbar 1 that is exposed through the heat dissipation recess 42 is the exposed portion 14. By cooling the exposed portion 14 through the heat dissipation recess 42 with the cooling device 30 provided at a position facing the heat dissipation recess 42, the busbar 1 can be efficiently cooled by the cooling device 30 without the case 4a therebetween.

Figure 3:
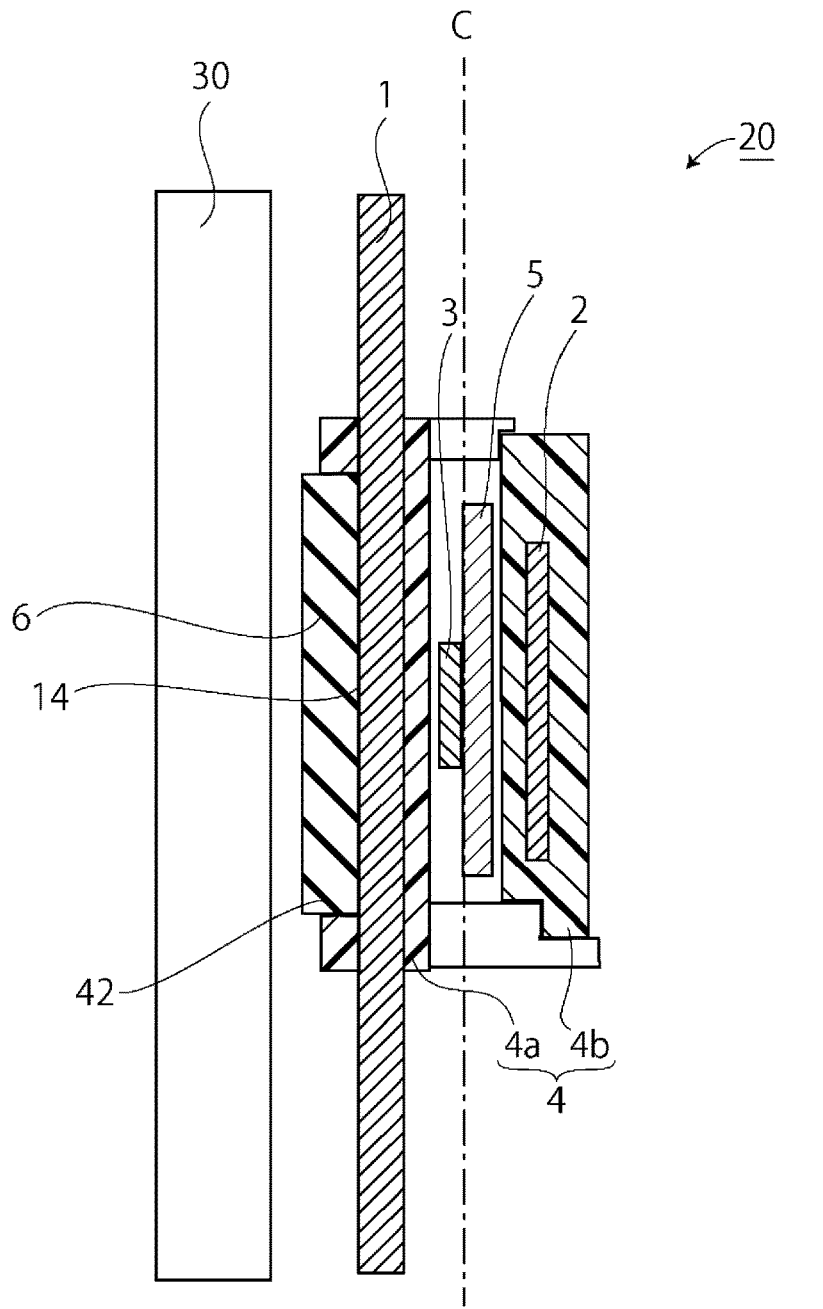
FIG. 3 is a cross-sectional view of a current sensor according to another modification.
Figure 3:
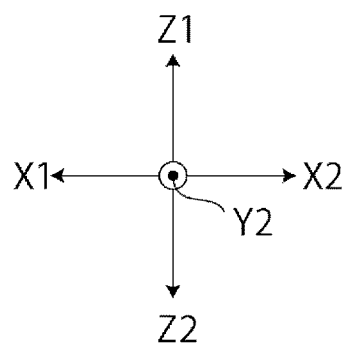

FIG. 3 is a cross-sectional view of a current sensor 20 according to another modification. As illustrated in FIG. 3, the exposed portion 14 of the busbar 1 may be covered by a sealing member 6. The sealing member 6 is made of a material having a higher heat transfer rate than the case 4a of the enclosure 4 and having insulating properties. Therefore, covering the exposed portion 14 of the surface of the busbar 1 with the sealing member 6 provides a measure to insulate the busbar 1 and prevent corrosion while ensuring the cooling property. According to the present invention, "having insulating properties" means that the breakdown voltage is higher than or equal to 5 to 10 kV/ram. Although the thermal conductivity and the insulating properties are generally in a trade-off relationship, a commercially available product or the like with an adjusted balance between the heat transfer rate and the insulating properties can be used. Examples of a commercially available product that can be used as the sealing member 6 include the insulated high-thermal conductive heat dissipation sheets FALTO-C, FEATHER-D6, Ramiel-LT, Ramiel-NEO, PT-SS, HITS-Y (product names, all available from SEKISUI POLYMATECH CO., LTD.).

Figure 4:
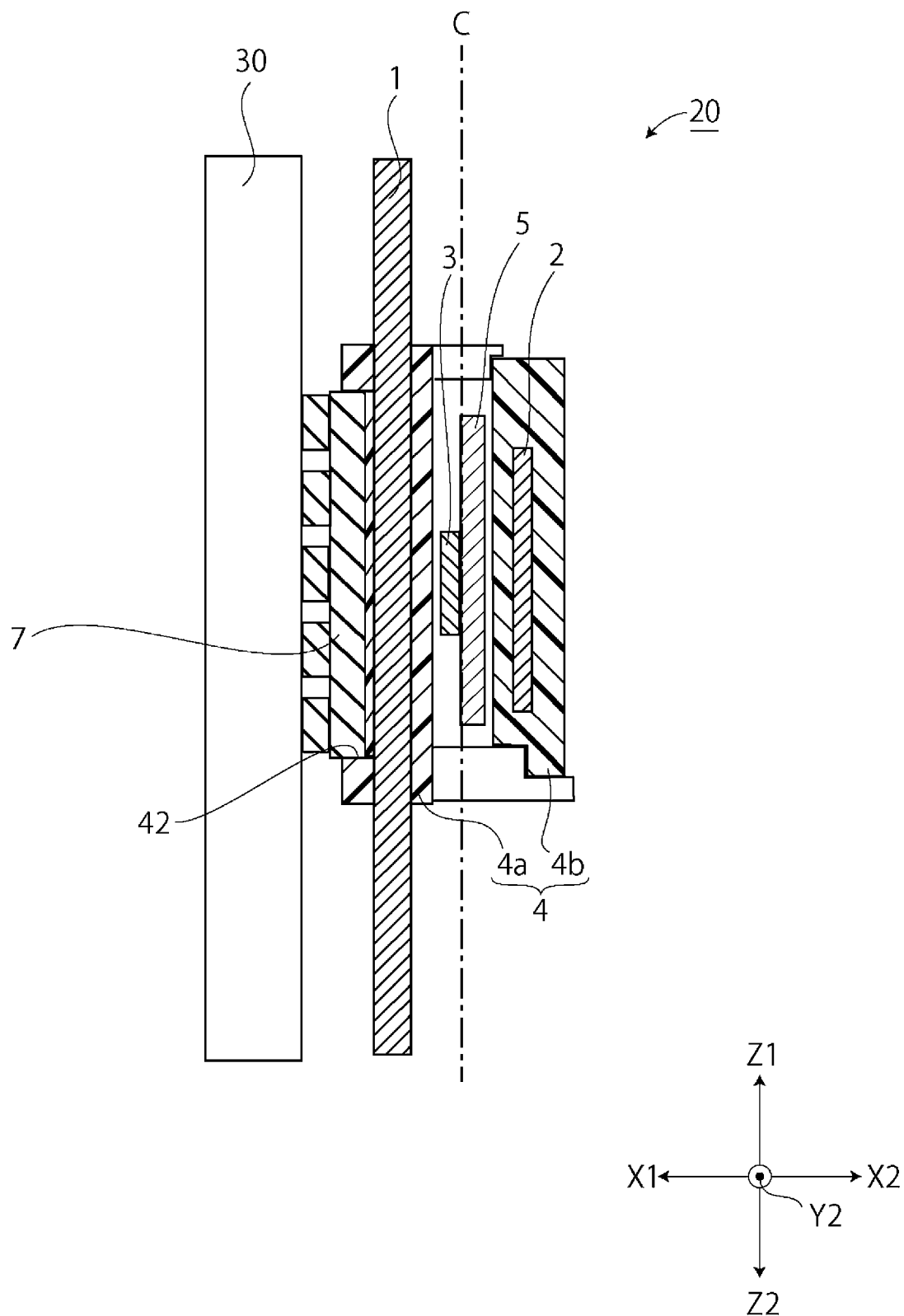
FIG. 4 is a cross-sectional view of a current sensor according to another modification.

FIG. 4 is a cross-sectional view of a current sensor 20 according to another modification. As illustrated in FIG. 4, a heat sink 7 may be provided between the busbar 1 and the cooling device 30. A heat sink 7 is provided on the X1-side surface of the case 4a of the enclosure 4. The heat sink 7 has concavo-convex shaped heat dissipating fins on a surface thereof and is disposed to face the cooling device 30. The material of the heat sink 7 can be a metal, alumina, ceramic, or another material with high thermal conductivity. According to the present modification, the heat sink 7 is provided in the heat dissipation recess 42 of the case 4a so as to cover the exposed portion 14. A configuration may be employed in which the heat dissipation recess 42 is not provided in the case 4a, and the heat sink 7 is in tight contact with the X1-side surface of the case 4a. Alternatively, a configuration may be employed in which the case 4a has, on the X1-side surface thereof, a concavo-convex shape that is similar to the heat dissipating fins of the heat sink 7.

Figure 5:
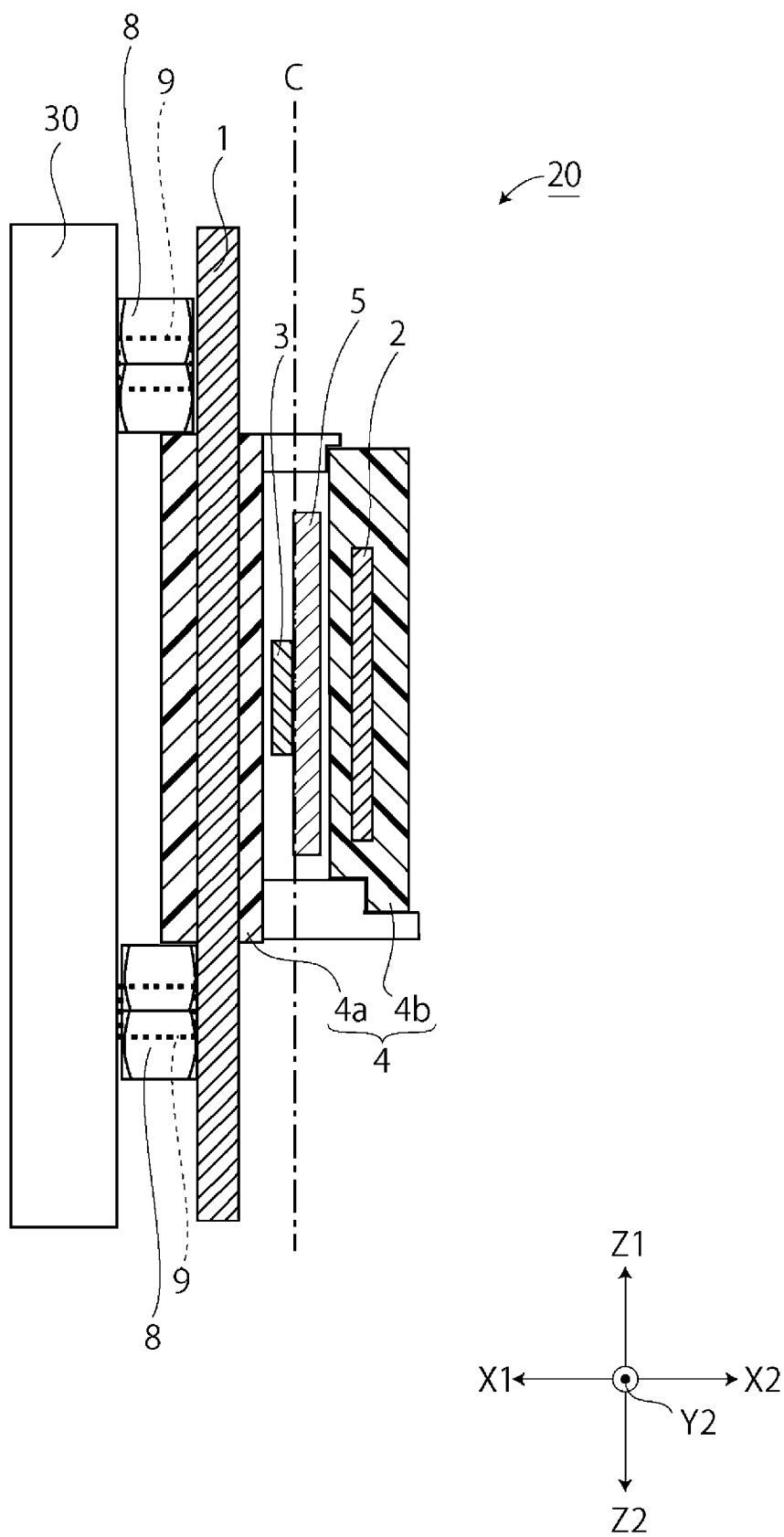
FIG. 5 is a cross-sectional view of a current sensor according to another modification.

FIG. 5 is a cross-sectional view of a current sensor 20 according to another modification. As illustrated in FIG. 5, a nut (a fastening member) 8 is disposed on the side of the busbar 1 facing the cooling device 30, and the nut 8 may be in contact with the busbar 1. Although the case 4a and nut 8 are illustrated as separate members in FIG. 5, the structure may be such that the nut 8 is embedded in the case 4a of the enclosure 4. The busbar 1 has a through-hole (not illustrated) that communicates with the threaded hole of the nut 8. An external terminal (not illustrated) having a through-hole similar to that of the busbar 1 can be disposed on the X2 side of busbar 1 so that its through-hole communicates with the threaded hole of the nut 8 and the through-hole of the busbar 1, a bolt 9 can be inserted through the through-hole of the external terminal, and the bolt 9 and the nut 8 can be fastened to fix the external terminal to the busbar 1. Since the nut 8 is in contact with the busbar 1, the contact with the nut 8 has the same effect as if the heat dissipation area of the busbar 1 were increased, thus improving the cooling efficiency of the busbar 1.

Figure 6A:
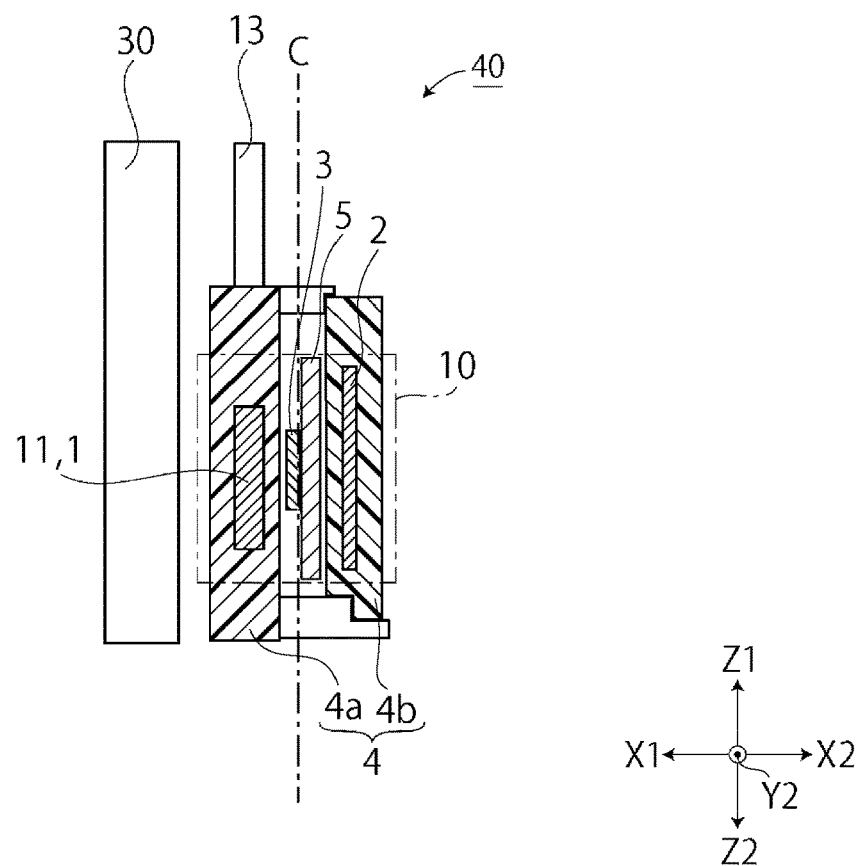
FIG. 6A is a cross-sectional view of a current sensor cut by the XZ plane along a straight line Lz illustrated in FIG. 6B.
Figure 6B:
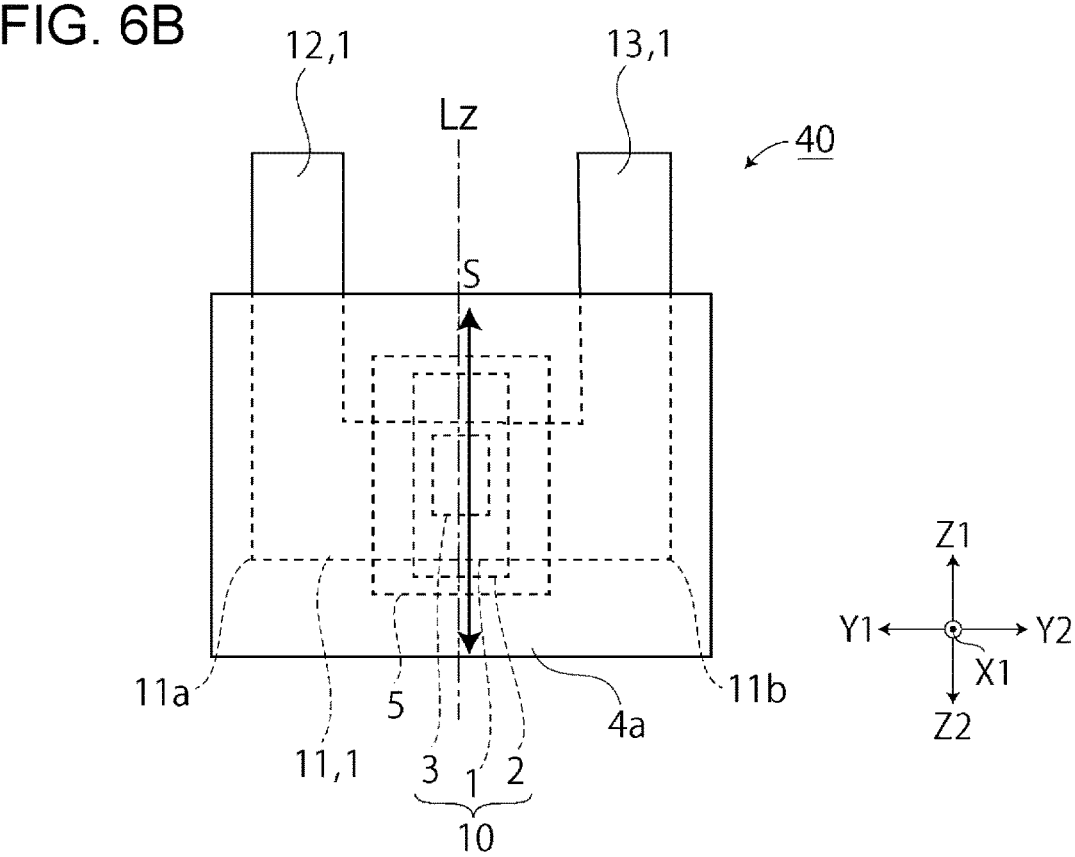
FIG. 6B is a plan view illustrating a positional relationship among members of the current sensor.

FIG. 6A is a cross-sectional view of a current sensor 40 cut by the XZ plane along the straight line Lz illustrated in FIG. 6B, and FIG. 6B is a plan view of the contours of parts represented with dotted lines to illustrate the positional relationship among members of the current sensor 40.

As illustrated in plan view of FIG. 6B, unlike the current sensor 20 including the busbar 1 that linearly extends, the current sensor 40 includes the busbar 1 having a bent portion. In addition, unlike the current sensor 20 including a plurality of measurement units 10 (refer to FIG. 1B), the current sensor 40 includes only one measurement unit 10.

The busbar 1 of the current sensor 40 includes a first current path 11 extending in a direction having a component in the Y-axis direction (a second direction) perpendicular to the X-axis direction (a first direction) and a second current path 12 and a third current path 13 extending from one end of the first current path 11 on the Y1 side of the Y-axis direction and the other end on the Y2 side, respectively, in directions each having a component in the Z-axis direction (a third direction) perpendicular to the X-axis direction and Y-axis direction. The magnetic sensor 3 is disposed to face the first current path 11, and the sensitivity direction of the magnetic sensor 3 is the Z-axis direction. This makes it possible to reduce the influence of disturbances caused by a magnetic field from an adjacent current sensor 40 when the current sensors 40 for a plurality of phases are arranged in the Y-axis direction. As a result, the measurement accuracy can be improved.

The phrase "extending in a direction having a component in the Z-axis direction" means that when the components of the extending direction of a line segment between both ends of a flow path are resolved along the reference axes, the component in the Z-axis direction is the largest. It is desirable that 90% or more of the components be the components in the Z-axis direction, and it is more desirable that all of the components be the components in the Z-axis direction, that is, the flow path extend in the Z-axis direction. Also, the phrase "extending in the direction having a component in the Y-axis direction" has similar meaning as "extending in the direction having a component in the Z-axis direction" described above.

Figure 7A:
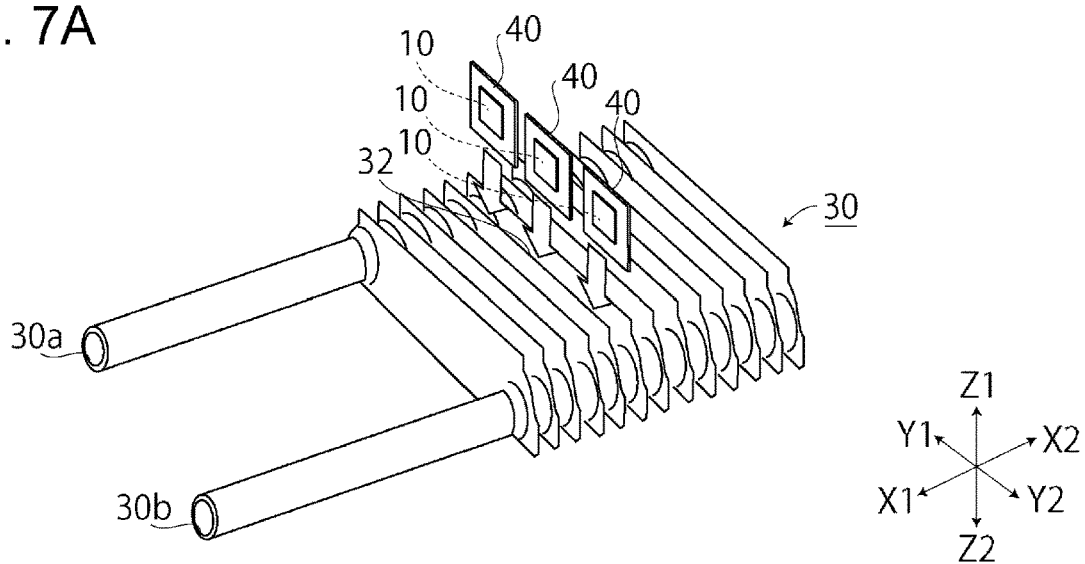
FIG. 7A is a perspective view illustrating the position of the current sensor relative to the cooling device.
Figure 7B:
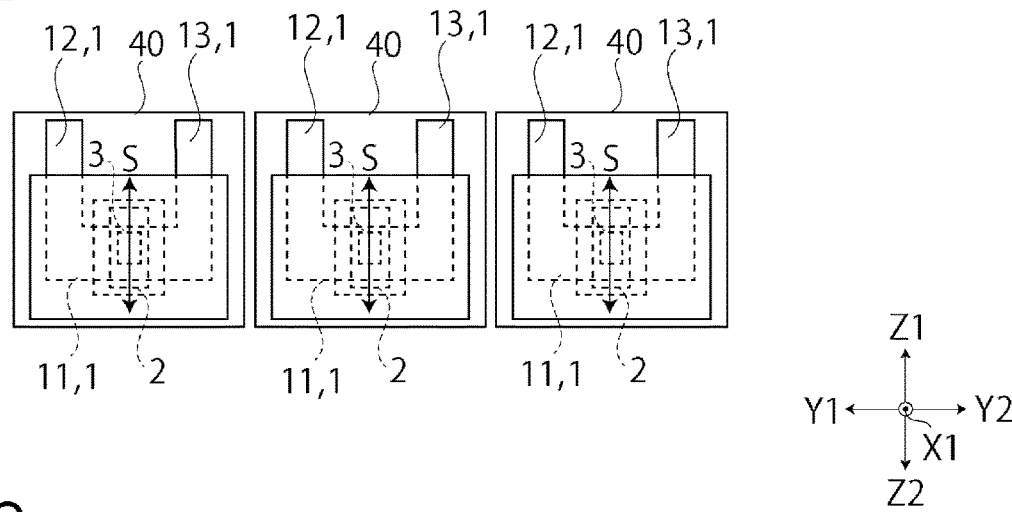
FIG. 7B is a plan view illustrating the position of a current sensor relative to the cooling device.
Figure 7C:
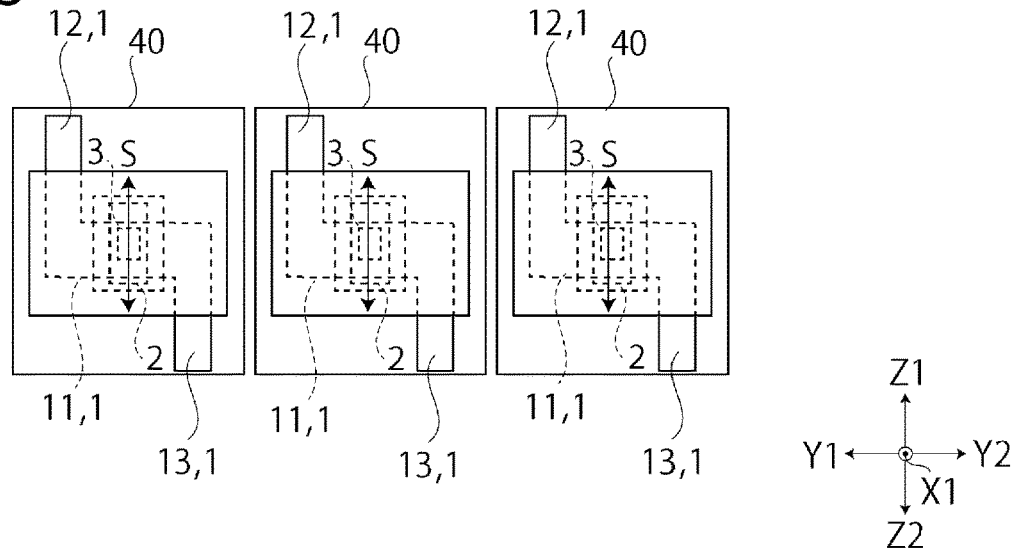
FIG. 7C is a plan view of the current sensor illustrated in FIG. 7B according to a modification.

FIG. 7A is a plan view schematically illustrating the position of the current sensors 40 relative to the cooling device 30, and FIG. 7B is a plan view illustrating the contours of parts of the disposed current sensors 40 represented with dotted lines. FIG. 7C is a plan view illustrating the contours of parts of a current sensor 40 according to a modification. Each of the current sensors 40 includes, as a single phase, the measurement unit 10 (refer to FIGS. 6A and 6B) including a busbar 1, a shield 2, and a magnetic sensor 3. In this case, a plurality of current sensors 40 are arranged side by side, thus allowing a plurality of phases to be arranged side by side.

By setting the sensitivity axis S of the magnetic sensor 3 in the Z-axis direction, the influence of the magnetic field from an adjacent current sensor 40 can be reduced when a plurality of current sensors 40 are arranged in the Y-axis direction. The magnetic field generated in the first current path 11 of a current sensor 40 when a current flows in the busbar 1 does not reach the magnetic sensor 3 of the adjacent current sensor 40 because the magnetic field spreads concentrically from the first current path 11 serving as the central axis. In addition, the magnetic fields generated in the second current path 12 and the third current path 13 may reach the magnetic sensor 3 of the adjacent current sensor 40 because the magnetic fields spread concentrically from the second current path 12 and the third current path 13 serving as the central axes. However, because the magnetic fields generated in the second current path 12 and the third current path 13 contain almost no component in the Z-axis direction, the magnetic fields are rarely detected by the magnetic sensor 3 of the adjacent current sensor 40. That is, by setting the sensitivity axis S in the Z-axis direction and arranging the current sensors 40 side by side in the Y-axis direction, the influence of the magnetic field generated by the busbar 1 of the adjacent current sensor 40 is removed. Thus, the measurement accuracy of the current sensor 40 is improved. The current sensor 40 may be disposed in the cooling device 30 as a power card including the current sensor 40.

As illustrated in FIG. 7A, the cooling device 30 performs a cooling operation by circulating cooling water that is introduced and discharged from the water cooling pipe ports 30a and 30b. For example, the cooling device 30 made of aluminum is used. To ensure the insulating properties, the cooling device 30 may be coated with ceramic on the surface in contact with the current sensor 40. In the cooling device 30 illustrated in FIG. 7A, the current sensor 40 is in contact with the cooling device 30 on the X2 side in addition to the X1 side. Therefore, the current sensor 40 is cooled by the cooling device 30 from both sides in the X-axis direction. However, as illustrated in FIG. 6A, the busbar 1 is mounted on the X1 side from the center line C of the enclosure 4, and the shield 2 is not mounted on the X1 side of the busbar 1, so that the effect to dissipate the heat from the busbar 1 is greater on the X1 side than on the X2 side.

In the cooling device 30, a shield section 32 (refer to FIG. 2) capable of shielding magnetism may be provided at a position facing one side (the X1 side) of the enclosure 4 of the current sensor 40. Since the shield section 32 has the same function as the shield 2, the shield section 32 of the cooling device 30 can prevent the intrusion of disturbance noise from one side (the X1 side) of the current sensors 20 and 40. When the shield section 32 is provided, it is desirable that the insulating properties of the exposed portion 14 of the current sensor 40 (described below) be ensured.

FIGS. 7B and 7C illustrate examples of the shape of the busbar 1. For example, the busbar 1 can have a shape illustrated in FIG. 7B in which the second current path 12 and the third current path 13 extend to the same side (the Z1 side) with respect to the first current path 11 (a U-shape) or a shape illustrated in FIG. 7C in which the second current path 12 and the third current path 13 extend to opposite sides (a crank shape). However, these shapes are only examples, and the busbar 1 is not limited to such shapes. Current sensors 40 having different shapes of busbars 1 may be arranged side by side.

Figure 8A:
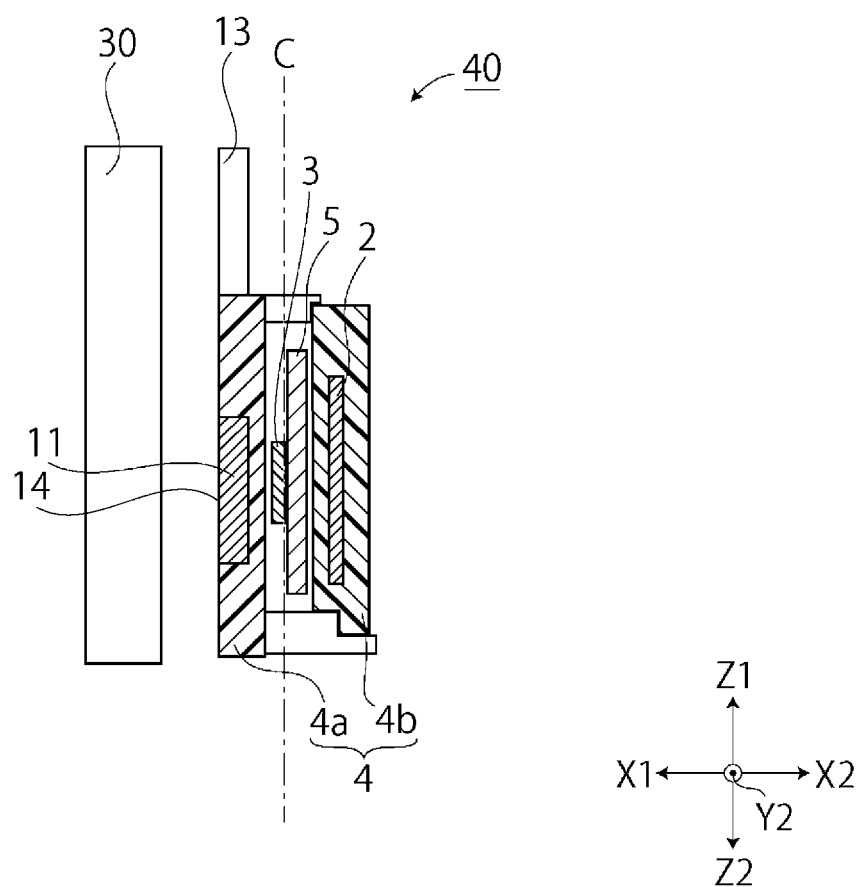
FIG. 8A is a cross-sectional view of a current sensor cut by the XZ plane along a straight line Lz illustrated in FIG. 8B, according to a modification.
Figure 8B:
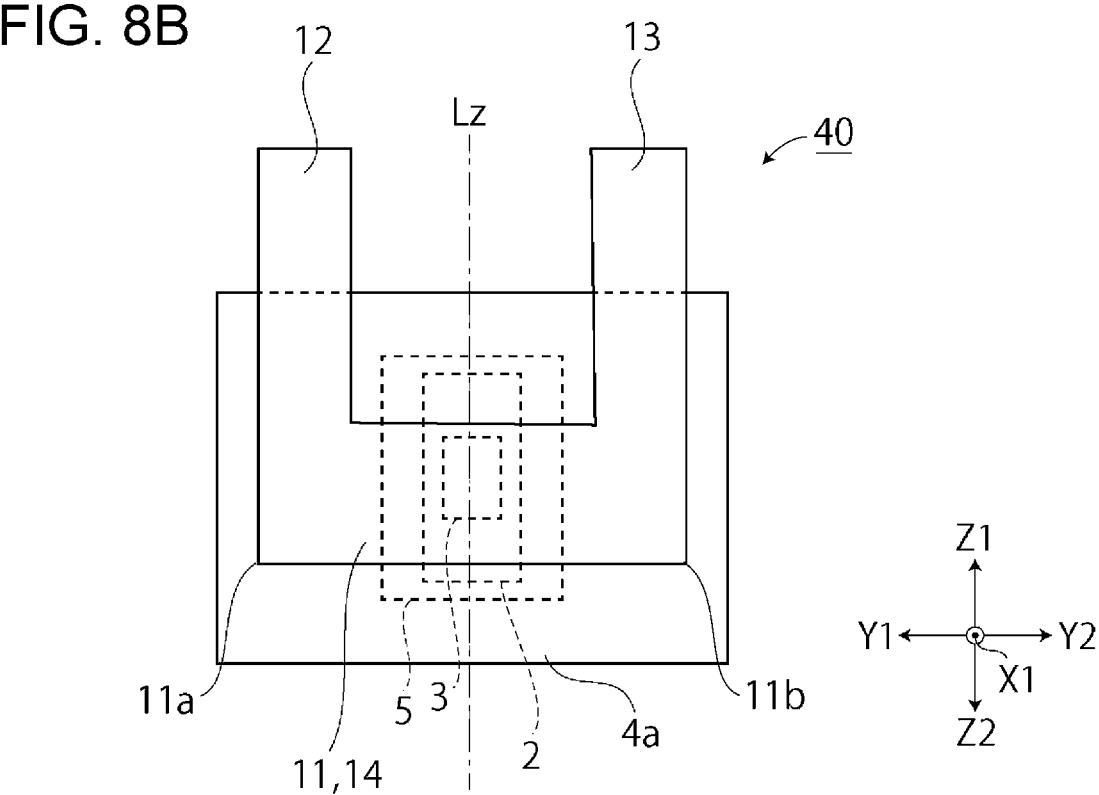
FIG. 8B is a plan view of the current sensor according to the modification.

FIG. 8A is a cross-sectional view of a current sensor 40 cut by the XZ plane along a straight line Lz illustrated in FIG. 8B. FIG. 8B is a plan view of the contours of parts represented with dotted lines to illustrate the positional relationship among parts of the current sensor 40. As illustrated in FIGS. 8A and 8B, the busbar 1 may have an exposed portion 14 that is not covered by the enclosure 4. By providing the exposed portion 14 in a region facing the cooling device 30, the cooling efficiency to cool the busbar 1 is improved.

Figure 9A:
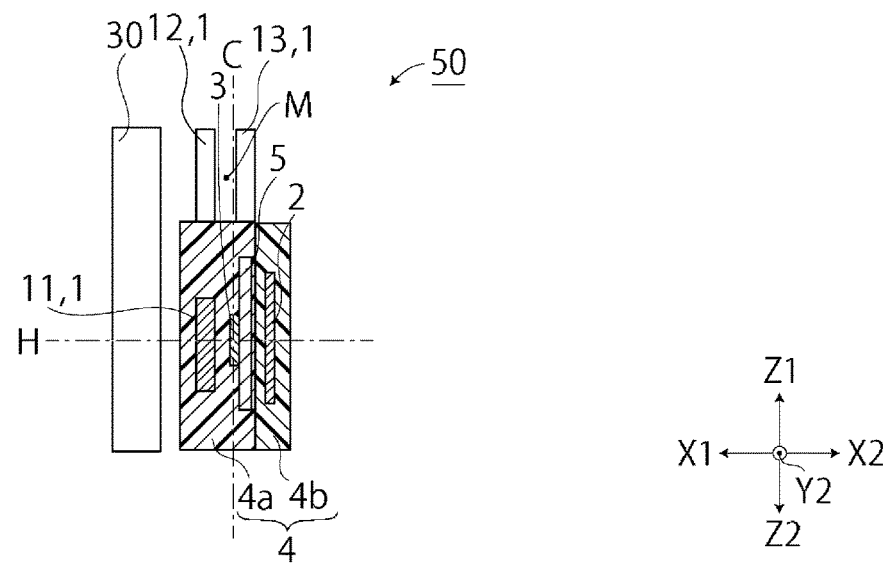
FIG. 9A is a cross-sectional view of a multiphase current sensor cut by the XZ plane along a straight line Lx illustrated in FIG. 9B.
Figure 9B:
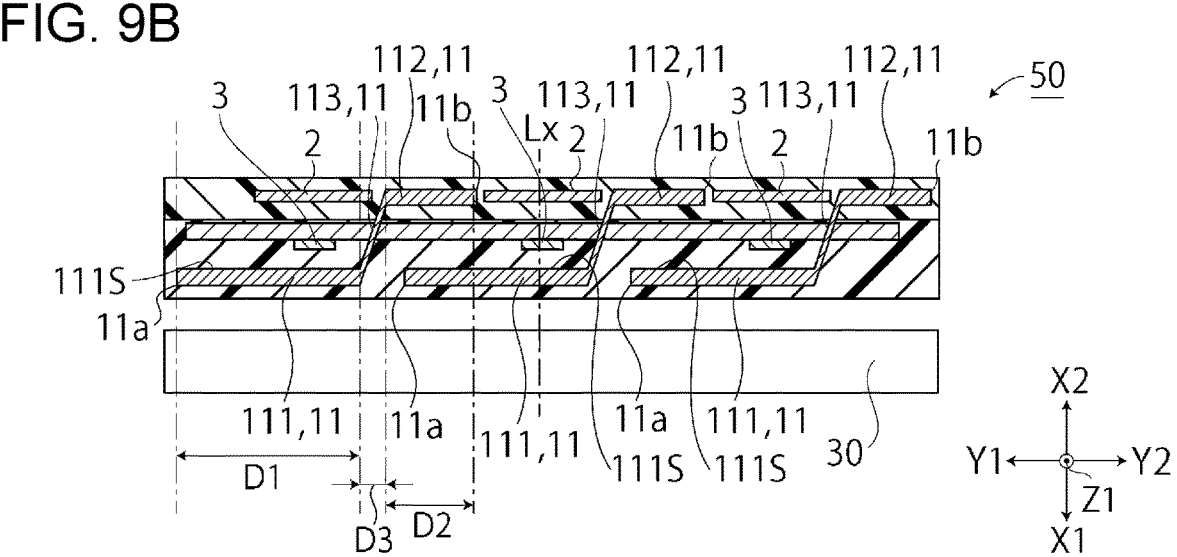
FIG. 9B is a cross-sectional view of the multiphase current sensor cut by the XY plane along a straight line H illustrated in FIG. 9A.
Figure 9C:
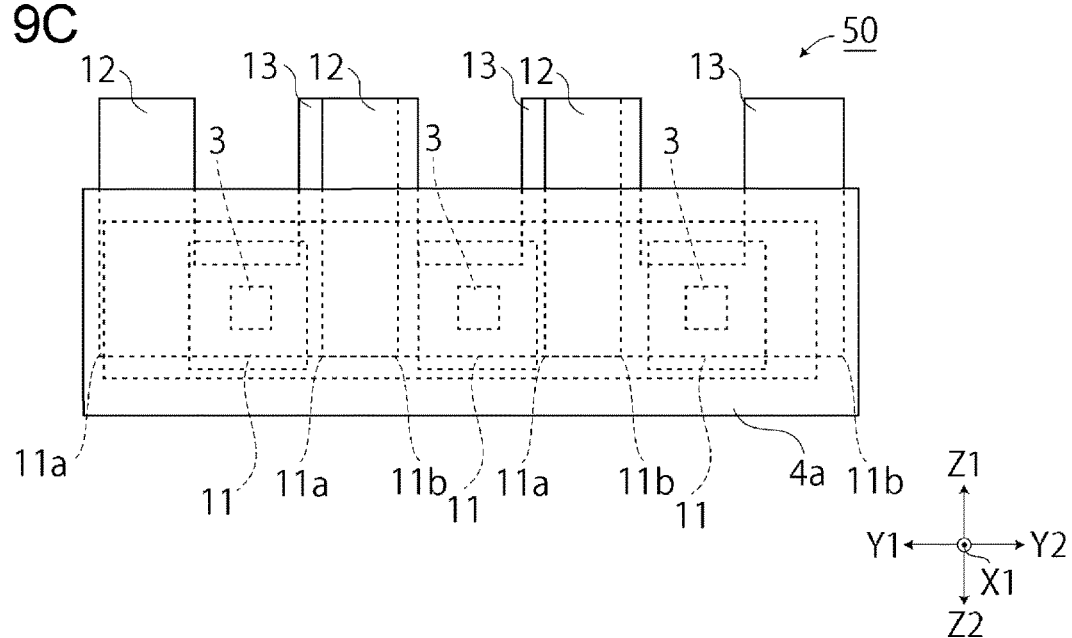
FIG. 9C is a plan view of the multiphase current sensor.

FIG. 9A is a cross-sectional view of a multiphase current sensor 50 cut by the XZ plane along a straight line Lx illustrated in FIG. 9B, FIG. 9B is a cross-sectional view of a current sensor 50 cut by the XY plane along the straight line H illustrated in FIG. 9A, and FIG. 9C is a plan view of the contours of parts of the current sensor 50 represented with dotted lines. The current sensor 50 is a three-phase unit, and when viewed in the X-axis direction, the current sensor 50 is disposed such that portions of adjacent busbars 1 overlap each other. A stepped portion provided in the busbar 1 reduces the width of the current sensor 50 in the Y-axis direction.

A plurality of magnetic sensors 3 of the current sensor 50 are arranged side by side in the Y-axis direction (the second direction). In the busbar 1, one end 11a of the first current path 11 and the second current path 12 extending from the one end 11a and the other end 11b and the third current path 13 extending from the other end 11b are disposed at different positions in the X-axis direction (the first direction). The first current path 11 includes a first flat portion 111 having the one end 11a, a second flat portion 112 having the other end 11b, and an intermediate portion 113 connecting the first flat portion 111 to the second flat portion 112. The intermediate portion 113 extends so as to intersect the Y-axis as viewed in the direction from Z1 to Z2.

As illustrated in FIG. 9A, when, in the busbar 1, the positions of the second current path 12 and the third current path 13 in the X-axis direction are different, the busbar 1 is located on the X1 side from the center of the enclosure 4, meaning that a midpoint M in the X-axis direction between the second current path 12 and the third current path 13 is located on the X1 side from the center line C of the enclosure 4.

As illustrated in FIGS. 9A and 9B, in the busbar 1 of the current sensor 50, the position of the second current path 12 differs from the position of the third current path 13 in the X-axis direction. More precisely, the busbar 1 bends toward the second flat portion 112 at a connection portion between the first flat portion 111 and the intermediate portion 113 and bends toward the second flat portion 112 at a connection portion between the second flat portion 112 and the intermediate portion 113. The magnetic sensor 3 in each of the phases is disposed so as to face a surface 111S of the first flat portion 111 of the first current path 11, that is, the surface adjacent to the second flat portion 112 (on the X2 side). As illustrated in FIG. 9C, the second current path 12 of the busbar 1 in one of adjacent phases and the third current path 13 of the busbar 1 in the other phase overlap at least partially in plan view as viewed in the X-axis direction. The configuration described above allows the size of the current sensor 50 in the Y-axis direction to be reduced by an overlap length of the second current path 12 of the busbar 1 in one of two adjacent phases and the third current path 13 of the busbar 1 in the other phase.

As illustrated in FIG. 9B, the busbars 1 in adjacent phases have the same position of the first flat portions 111 and the same position of the second flat portions 112 in the X direction. This configuration allows for a smaller increase in the size of the current sensor 50 in the X-axis direction. Furthermore, in the configuration, the positions of the shield 2 and the third current path 13 (the second flat portion 112) in the Y direction are the same and, thus, the increase in the size of the current sensor 50 in the X-axis direction can be further reduced.

Each of the busbars 1 is provided with portions of different heights in the thickness direction (the X-axis direction), and the busbars 1 are arranged so that the first flat portion 111 of one of the adjacent phases (the phase on the Y2 side) overlaps the second flat portion 112 of the other phase (the phase on the Y1 side). This configuration allows the pitch between adjacent current sensors 50 to be reduced.

As illustrated in FIG. 9B, when the first current path 11 is viewed in plan view in the Z-axis direction, a length D1 of the first flat portion 111 in the Y-axis direction (the second direction) is greater than the sum of a length D2 of the second flat portion 112 and a length D3 of the intermediate portion 113 (D1>D2+D3). By increasing the length D1 in this manner, a region of the first flat portion 111 where a current to be measured flows in the approximate Y-axis direction is increased, and the current can be accurately measured by the magnetic sensor 3.

In FIG. 9B, the intermediate portion 113 extends diagonally to the X-axis direction (the first direction), but the intermediate portion 113 may be configured to extend in a direction parallel to the X-axis direction. However, in order to enable the length D1 of the first flat portion 111, the length D2 of the second flat portion 112, and the length D3 of the intermediate portion 113 to satisfy the relationship D1>D2+D3 as described above and secure a space for placing the magnetic sensor 3 that faces the first flat portion 111, the length D2 of the second flat portion 112 is, realistically, almost the same as the length of the third current path 13 in the Y direction. Therefore, when the intermediate portion 113 is configured to extend in a direction parallel to the X-axis direction, the dimension at which the second current path 12 and the third current path 13 can be placed so as to overlap each other in the X-axis direction cannot be made very large, considering the electrical insulation between the busbars 1. However, by using the diagonally extended configuration, the other second current path 12 can be disposed so as to overlap the intermediate portion 113 of the adjacent current sensor 50, so that the overlap between the busbar 1 in one phase and the busbar 1 in the other phase can be increased, and the size of the current sensor 50 can be reduced. If the overlap is not increased, electrical insulation between busbars 1 arranged next to each other can be achieved more reliably, making it easier to handle large currents.

As illustrated in FIGS. 9A and 9B, arrangement is made such that the distance between the second current path 12 and the third current path 13 in the X-axis direction (the first direction) is greater than the distance between the second current path 12 and the magnetic sensor 3. In other words, the third current path 13 is disposed opposingly across the magnetic sensor 3 from the second current path 12. Still in other words, the third current path 13 is disposed closer to the other side (the X2 side) of the enclosure 4 than the magnetic sensor 3. By placing the third current path 13 closer to the other side of the enclosure 4, the heat generated in the third current path 13 can be easily dissipated to the other side of the enclosure 4.

The third current path 13 and the second flat portion 112 are disposed at positions so as not to overlap the shield 2 in the X direction, that is, as viewed along the X-axis. This facilitates efficient heat dissipation of the heat generated in the third current path 13 and the second flat portion 112 to the other side of the enclosure 4 without being blocked by the shield 2.

Furthermore, the third current path 13 and the second flat portion 112 are disposed at the same position as the shield 2 in the Y direction, that is, the positions where the third current path 13 and the second flat portion 112 overlap the shield 2 as viewed along the X-axis. This further facilitates efficient heat dissipation of the heat generated in the third current path 13 and the second flat portion 112 to the other side of the enclosure 4 without being blocked by the shield 2.

When cooled by the cooling device 30 illustrated in FIG. 7A, the third current path 13 and the second flat portion 112 are easily cooled by the cooling device 30 disposed on the other side of the enclosure 4. Furthermore, an increase in the size of the current sensor 50 in the X-axis direction can be further reduced.

Figure 10A:
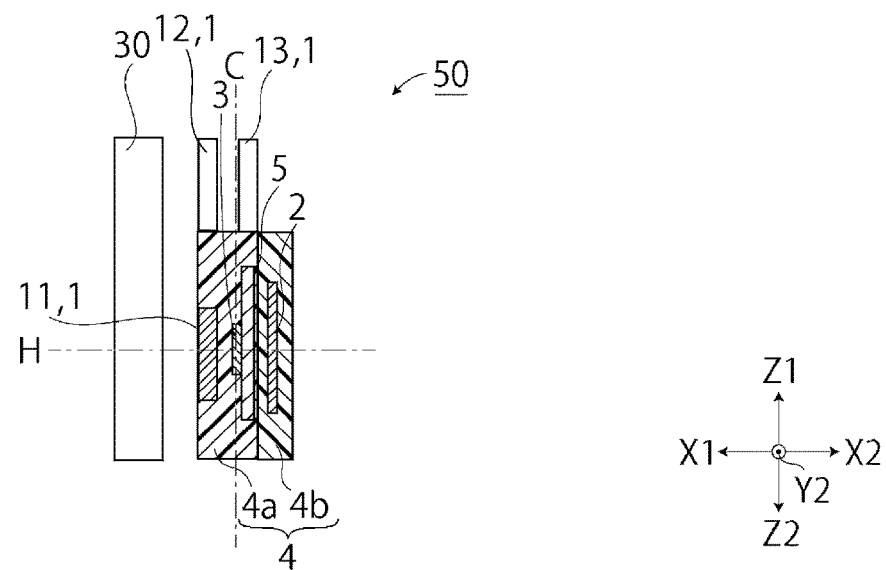
FIG. 10A is a cross-sectional view of a multiphase current sensor cut by the XZ plane along a straight line Lx illustrated in FIG. 10B, according to a modification.
Figure 10B:
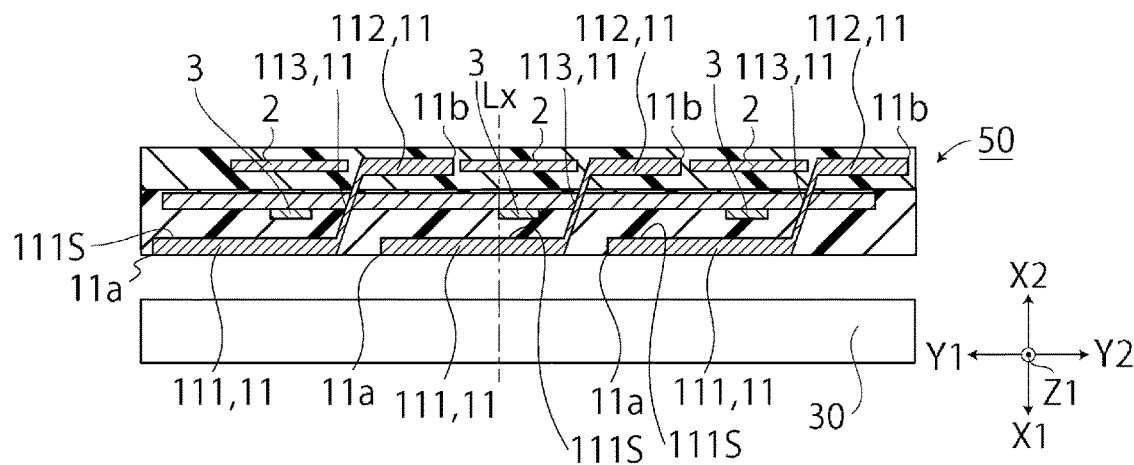
FIG. 10B is a cross-sectional view of the multiphase current sensor cut by the XY plane along a straight line H illustrated in FIG. 10A, according to the modification.
Figure 10C:
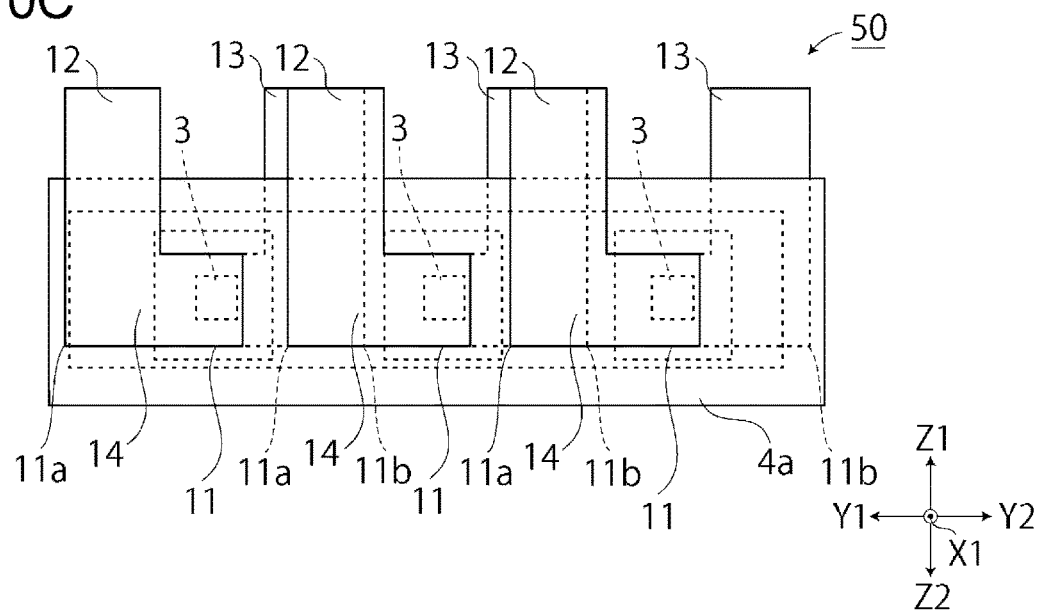
FIG. 10C is a plan view of the multiphase current sensor according to the modification.

FIG. 10A is a cross-sectional view of a current sensor 50 cut by the XZ plane along a straight line Lx illustrated in FIG. 10B, according to a modification. FIG. 10B is a cross-sectional view of the current sensor 50 cut by the XY plane along a straight line H illustrated in FIG. 10A, and FIG. 10C is a plan view illustrating the contours of parts of the current sensor 50 represented with dotted lines. As illustrated in FIGS. 10A to 10C, the current sensor 50 may be configured so as to have an exposed portion 14 on the surface (the X1 side) that is opposingly across the first current path 11 from the magnetic sensor 3 and, in the exposed portion 14, part of the busbar 1 is exposed. To prevent the busbar 1 from lifting against the enclosure 4, an anchor structure that is buried in the enclosure 4 may be provided around part of the outer edge of the portion where the busbar 1 is exposed. While the present modification describes a structure in which only the first flat portion 111 of the first current path 11 is exposed, a configuration in which the second flat portion 112 is also exposed may be employed. Such a structure improves the heat dissipation property and cooling property.

Figure 11A:
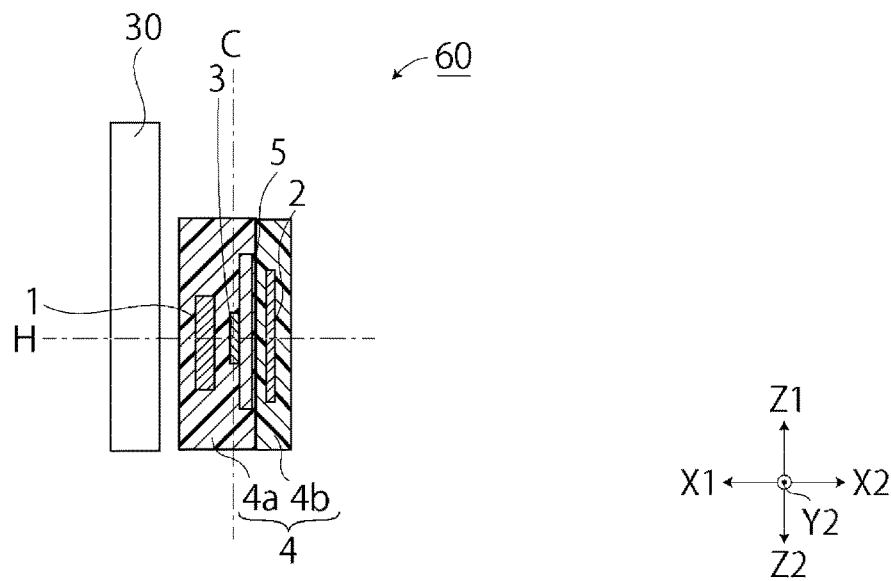
FIG. 11A is a cross-sectional view of a current sensor cut by the XZ plane along a straight line Lx illustrated in FIG. 11B, according to a modification.
Figure 11B:
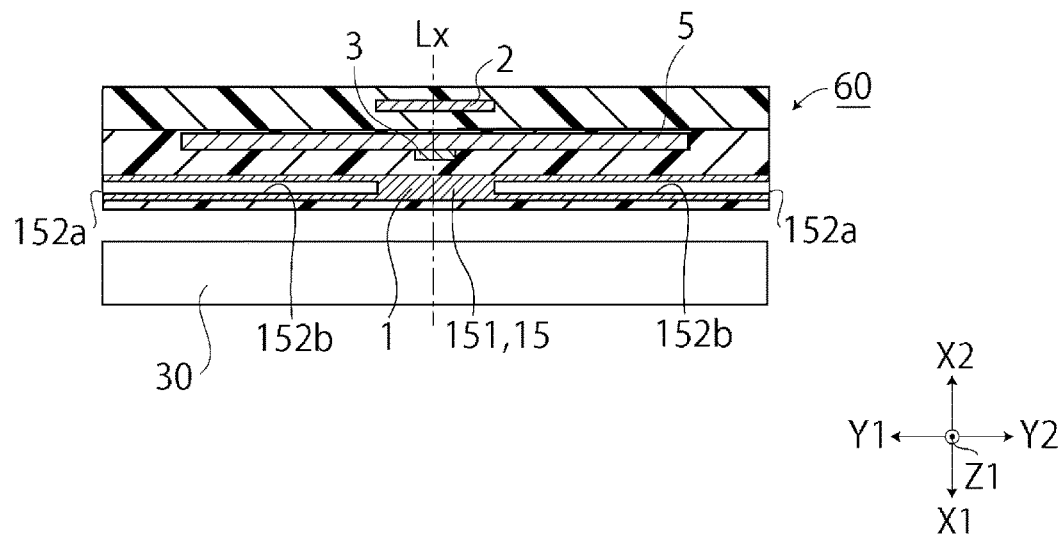
FIG. 11B is a cross-sectional view of the current sensor cut by XY plane along a straight line H illustrated in FIG. 11A, according to the modification.
Figure 11C:
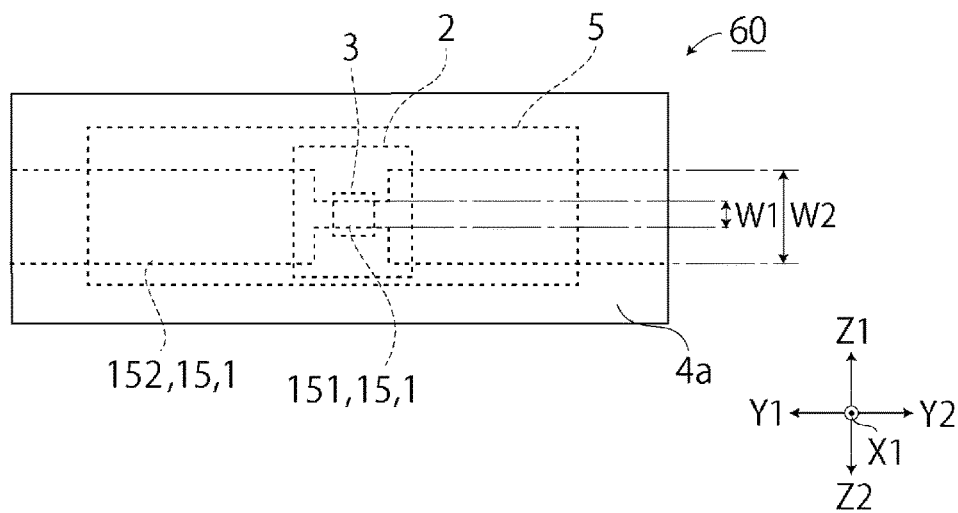
FIG. 11C is a plan view of the current sensor according to the modification.

FIG. 11A is a cross-sectional view of a current sensor 60 cut by the XZ plane along a straight line Lx illustrated in FIG. 11B, according to another modification. FIG. 11B is a cross-sectional view of the current sensor 60 cut by the XY plane along a straight line H illustrated in FIG. 11A, and FIG. 11C is a plan view of the contours of parts of the current sensor 60 represented with dotted lines.

A busbar 1 of the current sensor 60 includes a heat dissipating section 15 facing the cooling device 30 at the portion facing the magnetic sensor 3. By providing the heat dissipating section 15 in the busbar 1, the cooling efficiency by the cooling device 30 is improved.

The heat dissipating section 15 has wide heat dissipation portions 152 each having a width W2 in the Z-axis direction that is greater than a width W1 of a to-be-measured portion 151 on either side of the to-be-measured portion 151 that faces the magnetic sensor 3 as viewed in the X-axis direction. The wide heat dissipation portion 152 has, formed therein, a hollow portion 152b that extends from the to-be-measured portion 151 and that has a tip side opening 152a. Thus, the wide heat dissipation portion 152 functions as a heat pipe. This configuration increases the surface area of the wide heat dissipation portion 152 and facilitates dissipation of heat from the busbar 1 to the cooling device 30. As a result, the cooling efficiency is improved.

As described above, the present invention can efficiently cool a busbar by a cooling device and, thus, is useful as a current sensor suitable for electric vehicles and hybrid vehicles with large capacity motors.

What is claimed is:

1. A current sensor, wherein the current sensor is cooled by a cooling device, the current sensor comprising:
   a busbar;
   a shield disposed to face the busbar;
   a magnetic sensor disposed between the shield and the busbar; and
   an enclosure configured to integrally encase part of the busbar, the shield, and the magnetic sensor,
   wherein, when a side on which the busbar is disposed in a first direction in which the busbar, the magnetic sensor, and the shield are arranged is defined as one side, the busbar is disposed on the one side from a center of the enclosure, and
   at least the one side of the enclosure is disposed to face the cooling device,
   the busbar includes a first current path extending in a direction having a component of a second direction that is perpendicular to the first direction and a second current path and a third current path extending from the one end and the other end in the second direction of the first current path, respectively, in a direction having a component of a third direction that is perpendicular to the first direction and the second direction, and
   the magnetic sensor is disposed to face the first current path, and a sensitivity direction of the magnetic sensor is the third direction.

2. The current sensor according to claim 1, wherein a plurality of measurement units each including the busbar, the shield, and the magnetic sensor are arranged in the second direction.

3. The current sensor according to claim 2, wherein a position of the second current path extending from the one end of the first current path differs from a position of the third current path extending from the other end in the first direction, and
   wherein, as viewed in the first direction, the second current path of one of two of the adjacent busbars and the third current path of the other busbar are disposed so as to overlap at least partially.

4. The current sensor according to claim 3, wherein the first current path includes a first flat portion having the one end, a second flat portion having the other end, and an intermediate portion that connects the first flat portion to the second flat portion, and
   wherein, as viewed in the third direction, the intermediate portion extends diagonally to the first direction.

5. The current sensor according to claim 4, wherein the magnetic sensor is disposed to face a surface of the first flat portion of the first current path adjacent to the second flat portion.

6. The current sensor according to claim 5, wherein, when the first current path is viewed in a plan view from the third direction, a length of the first flat portion is greater than a sum of a length of the second flat portion and a length of the intermediate portion in the second direction.

7. The current sensor according to claim 1, wherein the busbar includes an exposed portion that is in a surface on the one side in the first direction and that is not covered by the enclosure, and the exposed portion faces the cooling device.

8. The current sensor according to claim 7, wherein the exposed portion is covered by a sealing member having a higher heat transfer rate than the enclosure and having electrical insulating properties.

9. The current sensor according to claim 1, wherein the busbar includes a heat dissipating section in a portion facing the magnetic sensor, and wherein the heat dissipating section faces the cooling device.

10. The current sensor according to claim 9, wherein the heat dissipating section includes, on either side of a to-be-measured portion facing the magnetic sensor as viewed in the first direction, wide heat dissipation portions each wider than the to-be-measured portion.

11. The current sensor according to claim 10, wherein the wide heat dissipation portion includes a hollow portion having a tip side opening.

12. The current sensor according to claim 1, wherein a heat sink is disposed on a side of the enclosure facing the cooling device and between the busbar and the cooling device.

13. The current sensor according to claim 1, wherein a fastening member is disposed on a side of the busbar facing the cooling device, and the fastening member is in contact with the busbar.

14. The current sensor according to claim 1, wherein the busbar is formed integrally with the enclosure.

15. The current sensor according to claim 1, wherein a substrate on which the magnetic sensor is provided is connected to the enclosure via a boss section of the enclosure.

16. The current sensor according to claim 1, wherein the cooling device includes a shield section that has a function of shielding magnetism on a portion of the cooling device facing the one side of the enclosure.

* * * * *